J. LANGENFELD.
DRAFT EQUALIZER.
APPLICATION FILED JULY 26, 1910.
1,010,775.
Patented Dec. 5, 1911.
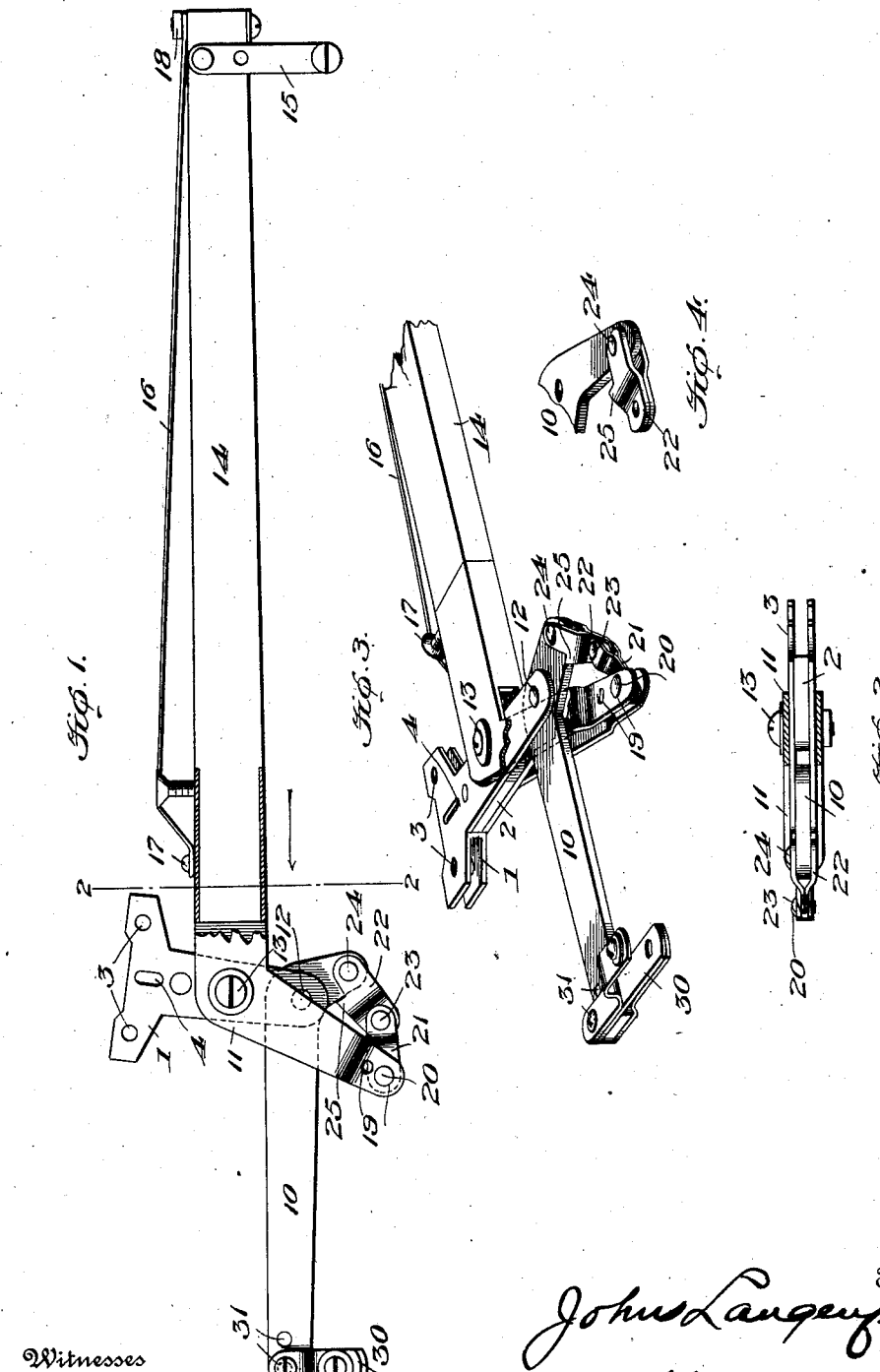

ated by a spacing block 2 riveted thereto
UNITED STATES PATENT OFFICE.

JOHN LANGENFELD, OF EARLING, IOWA.

DRAFT-EQUALIZER.

1,010,775.  Specification of Letters Patent.  Patented Dec. 5, 1911.

Application filed July 26, 1910. Serial No. 573,992.

*To all whom it may concern:*

Be it known that I, JOHN LANGENFELD, a citizen of the United States, residing at Earling, county of Shelby, and State of Iowa, have invented certain new and useful Improvements in Draft-Equalizers, of which the following is a specification.

This invention relates to draft equalizers.

The present invention is an improvement on the draft equalizer set forth in my Patent No. 834,986, dated November 6, 1906, and it has for its object the provision of certain novel and advantageous features, all of which will appear more fully hereinafter and be recited in the appended claim.

In the accompanying drawings: Figure 1 is a plan view, the socket for the draft bar being in section; Fig. 2, a section on line 2—2 of Fig. 1; Fig. 3, a detail perspective of the joint between the bell crank levers and attachment device, certain parts being broken away; and Fig. 4, a detail view showing the toggle lever link having the lug.

The present draft equalizer is adapted for use with either three or five horses and for connection to either a wagon or a plow. To adapt it for connection to either a wagon or a plow, I provide an attachment member 1 composed of upper and lower plates separated by a spacing block 2 riveted thereto and having holes 3 and a slot 4. The holes 3 are for the reception of a U-bolt and the slot 4 is intended to receive the hammer strap on the wagon tongue. These apertures also enable the attachment device to be readily connected to the clevis of a plow. There are bell cranks 10 and 11 of metal, the former being pivoted on a rivet 12 and disposed between the members of the attachment device and the upper bell crank 11 is slit, its parts straddling the attachment device and the bell crank 10 and being pivoted to the attachment device by a bolt 13. The bell crank 11 has a socket which receives a draft bar 14 having a yoke 15 at its free end for attachment to the double tree and it is preferably provided with a truss 16 anchored at 17 to the bell crank and at 18 to the draft bar. The forward end of the bell crank 11 has a plurality of apertures 19 in any one of which may be secured a bolt or rivet 20 on which, between the members of said bifurcated bell crank is pivoted one member 21 of a pair of toggle levers, the other member 22 of which is jointed to the member 21 at 23 and itself pivoted at 24 to the short end of the bell crank lever 10, which it straddles, being provided with a shoulder or lug 25 adapted to abut the said short end of said bell crank 10 to prevent said toggle levers 21 and 22 from coming into alinement and thus their disposition on a dead center is avoided. The outer end of the bell crank lever 10 is provided with a tree coupling 30 which may be secured in any of the plurality of apertures 31 in said bell crank lever.

Having thus described my invention, what I claim as new and desire to secure by Letters Patent, is:—

In a draft equalizer, the combination of bell crank levers with a two-piece toggle joint or lever connecting their short arms, and a stop on one of the members of said toggle levers adapted to abut the short arm of the bell crank lever to which it is pivoted and thereby prevent locking of said toggle levers in straightened position.

In testimony whereof, I hereunto affix my signature in presence of two witnesses.

JOHN LANGENFELD.

Witnesses:
 FLORENCE COLLINS,
 A. T. BENNETT.

---

Copies of this patent may be obtained for five cents each, by addressing the "Commissioner of Patents, Washington, D. C."